Jan. 30, 1968     F. E. TUTTHILL     3,366,759
PRESSURE RESPONSIVE LIQUID LEVEL PUMP CONTROL
Filed Dec. 27, 1965
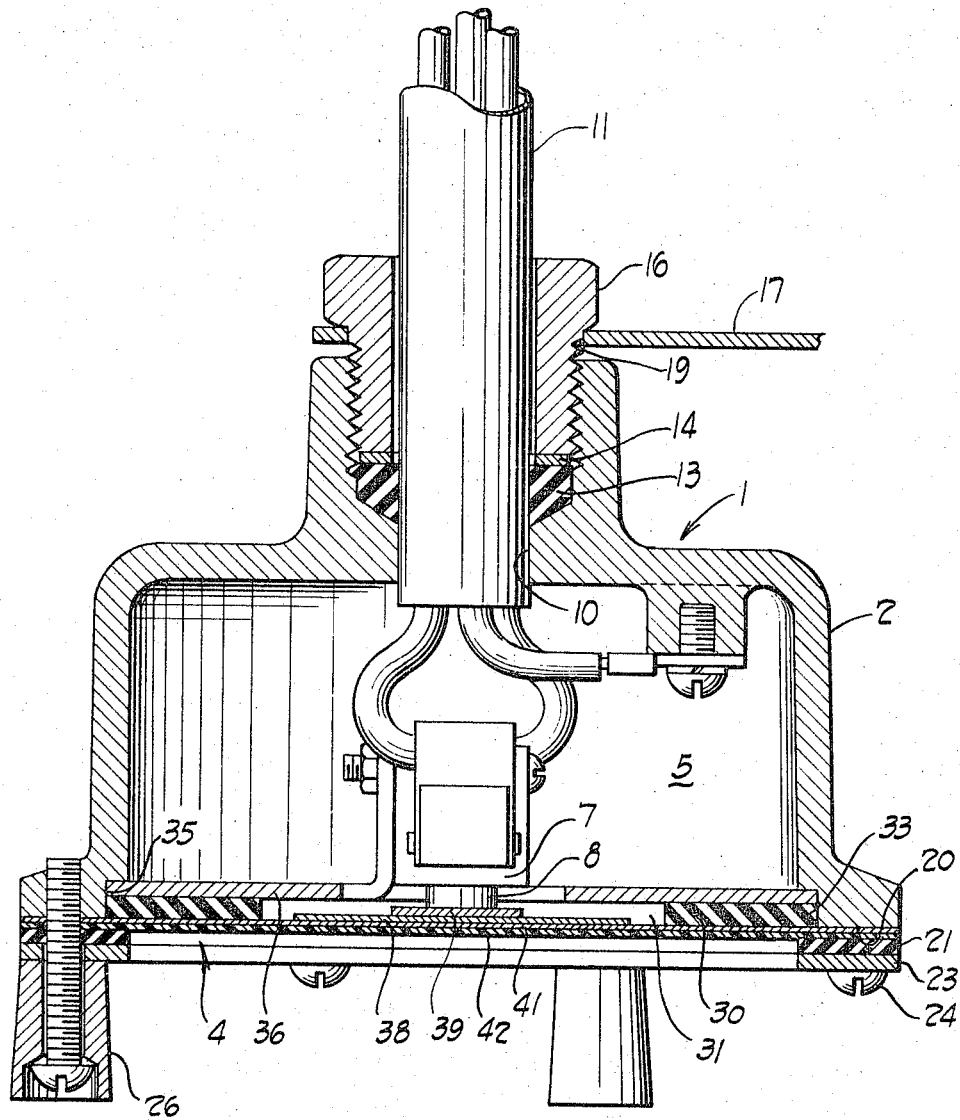
INVENTOR.
FRED E. TUTTHILL
BY Bosworth, Sessions,
Herrstrom & Knowles
ATTORNEYS.

United States Patent Office 3,366,759
Patented Jan. 30, 1968

3,366,759
PRESSURE RESPONSIVE LIQUID LEVEL PUMP CONTROL
Fred E. Tutthill, Grafton, Ohio, assignor to American Crucible Products Co., Lorain, Ohio, a corporation of Ohio
Filed Dec. 27, 1965, Ser. No. 516,610
7 Claims. (Cl. 200—83)

ABSTRACT OF THE DISCLOSURE

Structure to increase the operating differential of pressure responsive, liquid level pump controls having pressure sensitive diaphragms by reducing the effective diameter of the diaphragm in one direction only and to obviate the needs of skirts on submerged pressure responsive, liquid level pump controls.

Background of the invention

*Field of the invention.*—This invention relates to pump controls and more particularly to pressure responsive, liquid level pump controls.

*Description of the prior art*

Pump controls, which are responsive to the static pressure of a first predetermined liquid level to actuate the pump motor and to a change in conditions resulting from operation of the pumps such as the reduction of the static pressure to that of a second, lower predetermined liquid level to deactuate the pump motor, are well known in the art.

Certain of the early pressure responsive pump controls had a plurality of pressure sensitive diaphragms and switches adapted to respond, in a predetermined sequence, to changing pressure conditions, as liquid collected to a predetermined level and then was reduced, by the operation of the pump, to a lower predetermined level to actuate, maintain the operation of and deactuate a pump motor. Such controls are shown, for example, in U.S. Patents Nos. 2,635,546, 2,910,003, and 2,969,740.

Certain of these prior art controls were made adjustable to respond to different, predetermined pressures and/or liquid levels (for actuation and/or deactuation of the pump) by providing adjustable screw means for loading (and unloading) the inner side of the pressure sensitive diaphragm to increase or decrease its resistance to deflection by and in response to the pressures acting on the outer side of the diaphragm.

Subsequently, pressure responsive controls of this general type were equipped with a switch having an operating differential, i.e., requiring a greater force to actuate or close the switch than to hold it in a closed position. As a result, a single switch and diaphragm could be used to respond to a first or higher liquid level to close the circuit and actuate the pump motor and to respond to the reduction of the liquid level, below that necessary to maintain the switch closed, to open the switch and deactuate the pump motor. Thus the necessary operating differential to make the control responsive to two different pressure conditions to actuate and deactuate the pump motor became a function of the switch characteristics per se.

Such single switch, single diaphragm controls have not proven entirely satisfactory in practice, however, because of the limited range between the actuating and deactuating forces or operating differential of the switch. For example, one switch commonly used for the purposes of a pressure responsive liquid level control actuates in response to a force of 11 oz. and deactuates when the force acting thereon drops below 2½ oz.

Since the same diaphragm was the source of both the actuating and holding force, this meant that the pump would only evacuate about ¾ of the accumulated liquid depth and, taking into account the practical manufacturing considerations as to size of diaphragm and the like, the pump effectively operated to exhaust a liquid level from a depth of about eight inches to a depth of about three inches, plus or minus two inches and 1½ inches, respectively.

It is true that by proper container, receptacle or sump design this change in liquid level could be made to represent a greater proportion of contained liquid. It is preferable, however that such controls function well as independently of container design as practical so as to be effective in a wide range of applications, in homes, factories, farms, and the like.

Further it is desirable that the range of actuating pressures (liquid level heights or depths at which actuation takes place) be selectively varied, on a predetermined basis, in order that the control and, therefore, the pump, which is controlled thereby, be useful or readily adapted to be useful in a wide variety of applications and under a wide variety of conditions.

Summary of the invention

It is, therefore, a general object of this invention to provide a new and improved single switch, single diaphragm pressure responsive, liquid level pump control.

Other objects of this invention include the provision of a new and improved single switch, single diaphragm pressure responsive, liquid level pump control which is readily and easily adapted for a wide range of predetermined actuating pressures; which is economical to construct and use; which does not utilize springs, screws or other mechanical means to obtain adjustment; which does not otherwise interfere with the structure and function of the control and/or the pump controlled thereby; which may be changed and adjusted in the field even by unskilled persons; which does not damage or otherwise change the structure and nature of the diaphragm per se; which may be used with any pump; and, which does not interfere with or change the deactuation response of the control, from what it otherwise would be.

Still further objects of this invention include the provision of new and improved means for selectively varying the actuation responsive of a single switch, single diaphragm pressure responsive, liquid level pump control, and the like, which is economical to make and use; which is readily installed and interchanged to selectively and predeterminedly vary and adjust the effective operating differential of the switch and thereby, the liquid level at which actuation or deactuation occurs; which is positive in its action and effect; and, which restrains or restricts the movement and displacement of the diaphragm in one direction but not the other.

Still another object of this invention is to provide a new and improved method of increasing or changing the operating differential of a switch in a pressure responsive control.

Still other objects of this invention include the provision of a pressure responsive, liquid level pump control, which has new and improved means for preventing fouling of the pressure responsive diaphragm by grit, sand and other such deleterious matter in the liquid within which the control is used; and the provision of a control with such an anti-fouling means which is economically manufactured and used; which is simple and efficient in operation; which is reliable and of long life; and, which obviates the need for protective air traps, skirts, and the like, such as were common in the prior practice, for the diaphragm.

A still further object of this invention is to provide a pressure responsive, liquid level control and means and process for selectively predetermining the responsive differential of a pressure responsive, liquid level control, each obtaining one or more of the objects and advantages set forth above.

These and other objects and advantages of this invention will appear from the following description of a preferred form thereof, reference being had to the accompanying drawing.

*Brief description of the drawing*

The drawing is a vertical sectional view of a pressure responsive, liquid level control embodying a preferred form of this invention.

*Description of preferred embodiments*

A pump control embodying this invention is indicated generally at 1 in the drawing and includes a housing 2 which, together with a diaphragm, indicated generally at 4, defines a chamber 5 within which an ordinary microswitch 7 is mounted. Switch 7 is mounted with its operating button 8 disposed in operable relation with diaphragm 4 and, more particularly, with a reinforcement disc which is glued to the diaphragm to reinforce and protect it against damage due to engagement with the operating button.

Housing 2 is also provided with an aperture 10 through which a cord 11 is interconnected with switch 7 and a suitable power source, now shown. Aperture 10 is sealed, in a conventional manner, by means of packing 13, washer 14 and bushing or packing gland 16. Control 1 is conveniently mounted in position, while in use, by means of a bracket 17 having an aperture 19 therein through which bushing 16 extends. Bracket 17 is, in turn, mounted on the pump discharge pipe or other convenient media by a clamp, not shown.

Diaphragm 4 is conveniently held in place in sealing engagement with the lower edge 20 of housing 2 by gasket 21, retaining ring 23 and screws 24. Suitable legs or feet 26 may also be mounted on the housing 2, in order to ensure that the control 1 is mounted or supported at least a predetermined minimum distance above the bottom of the sump or container within which the control is used.

All of the above is old and well-known in the art and, per se, forms no part of the present invention.

Switch 7 is normally open and requires a predetermined actuating force to operate button 8 to close the switch and opens, after being closed, when button 8 is no longer opposed by a lesser predetermined force. A commonly used switch of this type requires, for example, an actuating force of 11 ounces, but remains closed and does not open or deactuate until the force acting on the switch button falls below 2½ ounces. The depth of the liquid which will, in fact, actuate and permit deactuation of the switch may, of course, be raised or changed by varying the size of the diaphragm—but this is not practical in production situations since a different housing or diaphragm aperture would be required for every different size diaphragm.

Further, while there is frequently good reason to vary and, in particular, to increase the height or depth of liquid at which actuation occurs, there is usually less reason for similarly changing the height of liquid which will remain when the switch opens. However, merely varying the size of the diaphragm, so as to increase or reduce the force exerted by a given liquid depth, must and does vary both actuation and deactuation depths proportionately, but oppositely. This has in fact proven unsatisfactory in practice as a means of increasing liquid actuation depth or increasing the operating differential of the switch.

Accordingly, in order to obtain the objects and advantages of this invention, a separate washer, adjustment member or restrictor 30 is provided in control 1 adjacent to and in immediate juxtaposed position with the inner side or unexposed face of diaphragm 4. Restrictor 30 is formed of rubber, plastic or other suitable material and is not glued, fastened or otherwise secured to diaphragm 4.

Thus restrictor 30 restricts or limits the response of diaphragm 4, as the same displaces to depress button 8 and actuate switch 7, but does not, in any way, restrict or limit the response of diaphragm 4 in a direction away from switch 7 and button 8.

Restrictor 30 preferably comprises a flat ring-like member having a central aperture 31 and an outer edge 33. Restrictor edge 33 has a diameter at least equal to the effective diameter of diaphragm 4 on the side on which the restrictor is located. Restrictor 30 is conveniently held in a fixed position against displacement in a direction away from diaphragm 4 by a suitable mounting on the control. Aperture 31 has a diameter of any desired predetermined size depending upon the pressure to which diaphragm 4 is to respond to exert the force necessary to actuate the switch.

Thus, the smaller the diameter of aperture 31, the greater the pressure (liquid depth) necessary to actuate the switch, since the diaphragm is effectively reduced in size, for purposes of switch actuation, to the diameter of the restrictor aperture 31 and yet must exert the same force (which is a function of diaphragm area and pressure exerted on the diaphragm) to actuate the switch. On the other hand, since the diaphragm is not restricted by restrictor 30 against displacement away from the switch 7 and switch operating button 8, the depth of liquid at which deactuation takes place will be the same without regard to the adjustment or varying of actuation depth, effected by the choice of a restrictor 30.

In practice, the restrictor 30 is chosen so as to have an internal diameter such as to provide the desired actuation depth depending on the specific gravity of the liquid to be pumped and the operating characteristics of the switch. Further, although the restrictor is conveniently chosen and installed upon manufacture of the control, the actuation depth may be controlled in the field by exchanging the installed restrictor for one having an aperture 31 of the proper size to provide the desired new actuation depth and such change or adjustment is relatively easily made and accomplished, even by unskilled persons.

In order to mount restrictor 30 in the desired position immediately adjacent and juxtaposed to diaphragm 4 and to anchored restrictor 30 so as to resist inward, upward, as viewed, movement of diaphragm 4, housing 2 is conveniently counterbored, as at 35, to receive restrictor 30. Further, in order to strengthen or stiffen restrictor 30, a plate 36 may be disposed on the inner side of restrictor 30. Plate 36 also, conveniently, functions as a bracket for supporting switch 7 in position in chamber 5. Counterbore 35 is of a depth equal to the thickness of bracket 36 and restrictor 30 so that restrictor 30 is disposed immediately adjacent diaphragm 4, which covers the otherwise open end of chamber 5.

In addition, reinforcing disc 38, on diaphragm 4, is built up, as at 39, to ensure that the motion and force of diaphragm 4 is transmitted to switch button 8.

Also, in order to increase the effectiveness of restrictor 30 in limiting the displacement of diaphragm 4 in the direction of actuation but not in the direction of deactuation in control 1, switch 7 preferably has a wide movement differential between turn on and turn off (of the order of 20 or 25 thousandths), so that the control advantageously utilizes the greater capacity for movement of diaphragm 4 in the direction of deactuation.

Control 1 also obviates the need for an air trap, such as skirt or similar structure, to protect the diaphragm and preserve it against fouling due to sand, grit and other debris, which are commonly found in sumps, and the like, and adhere to and otherwise deleteriously effect the diaphragm and its operation.

To this end the outer or exposed face, lower, as viewed, of diaphragm 4 is coated or covered with an anti-adherent, such as polytetrafluoroethylene, having a low coefficient of friction and low adhesion characteristics which resist adherence of foreign material and debris to the diaphragm.

Because of the absence of adhesion between the polytetrafluoroethylene and the debris in the liquid being pumped, the debris doesn't adhere to or foul the diaphram and the need for protection by means of an air pocket or trap is obviated.

The exposed face of diaphragm 4 is conveniently and preferably coated or covered in accordance with the precepts of this invention by providing an inner diaphragm member 41, made of rubber, or the like, to provide structural and flexing strength and a second, outer diaphragm member 42 of polytetrafluoroethylene, immediately juxtaposed to diaphragm member 41 in the exposed position, to obtain the objects of this invention.

Modifications and changes to the preferred forms of the invention disclosed herein may occur to those skilled in the art who come to understand the principles and precepts thereof. Accordingly, the scope of the patent to be issued hereon should not be limited to the forms of the invention herein specifically depicted and described but by the advance by which the invention has promoted the art.

I claim:
1. A pressure responsive liquid level pump control comprising a housing, a switch having a predetermined operating differential whereby a greater force is necessary to actuate and close said switch than to maintain said switch closed and a pressure responsive diaphragm mounted on said housing, said housing and diaphragm defining a switch chamber with said diaphragm comprising at least a portion of one wall thereof, said diaphragm having one side facing into said chamber and a second side, facing exteriorly said chamber, against which liquid pressure acts, said switch having an operating button responsive to a predetermined force exerted thereon to displace inwardly and close said switch and a lesser predetermined force to remain displaced inwardly and maintain said switch closed, said switch being mounted in said switch chamber with said operating button in operable relation with said one side of said diaphragm, a reinforcing disc on said one side of said diaphragm and engaging said operating button, and means supported on said housing, disposed in said switch chamber and juxtaposed to said diaphragm to limit the response of said diaphragm, in a direction toward said operating button only, by reducing the effective diameter of said diaphragm on said one side to increase the amount of liquid pressure acting on said diaphragm necessary to cause said diaphragm to exert said predetermined force on said operating button to displace said operating button inwardly and close said switch without increasing the liquid pressure acting on said diaphragm necessary to maintain said lesser predetermined force on said operating button to maintain said switch closed.

2. The control according to claim 1 in which said last named means comprises a flat, rigid ring-like restrictor mounted on said housing and having a central aperature through which force is transmitted from said reinforcing disc to said operating button and an outer diameter substantially equal to the outer effective diameter of said diaphragm, said diaphragm having movement independent of said restrictor in a direction away from said restrictor.

3. The control according to claim 2 in which said housing has a counterbore therein and said restrictor and diaphragm are disposed with their respective peripheral edges in said counterbore.

4. The control according to claim 2 with reinforcing means mounted adjacent said restrictor on the side thereof remote from said diaphragm and said switch being supported and mounted on said reinforcing means.

5. The control according to claim 1 in which said exterior face of diaphragm is coated with an anti-adherent.

6. The control according to claim 5 in which said antiadherent is polytetrafluoroethylene.

7. The control according to claim 5 in which said diaphragm comprises an inner diaphragm of rubber means and an outer diaphragm of polytetrafluoroethylene immediately juxtaposed to said inner diaphragm and in an exposed position to have direct contact with the liquid to which said diaphragm is responsive.

References Cited

UNITED STATES PATENTS

| | | | |
|---|---|---|---|
| 1,937,314 | 11/1933 | Bryant | 92—6 |
| 2,817,727 | 12/1957 | Schmeling | 92—101 |
| 3,254,573 | 6/1966 | Prell | 92—101 |
| 3,293,349 | 12/1966 | Diebold et al. | 174—12 |

OTHER REFERENCES

Information Bulletin, "Teflon 100 FEP," Sept. 6, 1962, pp. 1–5.

BERNARD A. GILHEANY, *Primary Examiner.*

H. B. GILSON, *Assistant Examiner.*